United States Patent [19]

Mumford et al.

[11] 4,427,431
[45] Jan. 24, 1984

[54] ELECTRONIC CONTROL OF A GLASS FORMING MACHINE

[75] Inventors: Eustace H. Mumford, Ottawa Lake, Mich.; Jack I. Perry, Sylvania, Ohio

[73] Assignee: Owens-Illinois, Inc., Toledo, Ohio

[21] Appl. No.: 426,508

[22] Filed: Sep. 29, 1982

Related U.S. Application Data

[63] Continuation of Ser. No. 249,280, Mar. 30, 1981, abandoned.

[51] Int. Cl.³ .......................... C03B 9/44; C03B 35/00
[52] U.S. Cl. ......................................... 65/163; 65/158; 65/160; 65/DIG. 13; 364/473; 364/476
[58] Field of Search ......... 65/158, 160, 163, DIG. 13; 364/473, 476

[56] References Cited

U.S. PATENT DOCUMENTS

| | | | |
|---|---|---|---|
| 1,911,119 | 5/1933 | Ingle | 65/160 |
| 3,762,907 | 10/1973 | Quinn et al. | 65/164 |
| 3,839,004 | 10/1974 | Becker | 65/163 X |
| 4,199,344 | 4/1980 | Mumford et al. | 65/260 |
| 4,203,752 | 5/1980 | Becker et al. | 65/163 |

*Primary Examiner*—Arthur D. Kellogg
*Attorney, Agent, or Firm*—Gerald T. Welch; Myron E. Click

[57] ABSTRACT

Each section of a multi-section glass forming machine contains a plurality of mechanisms for moving functional members in sequence for forming gobs into glass containers and for sweeping the containers from a cooling dead plate to a moving machine conveyor.

A plurality of reversible, electric motors are provided for each section to operate the rotation of the sweepout mechanism and for operating the other mechanisms, namely, the parison mold opening and closing mechanism, the funnel operating mechanism, the baffle operating mechanism, the invert arm operating mechanism, the blow mold operating mechanism, the blowhead operating mechanism and the take-out mechanism. Each motor is coupled directly to the drive shaft of the mechanism and the rotation of each motor is controlled by a programmable controller which permits the adjustment of the timing and velocity during machine operation of each motor independently of the other electric motors. The programmable controller is capable of storing several pre-programmed timing patterns easily selectable by switching. Also, the motors are coupled with velocity and position-sensing means which may provide feed-back signals for control of the motor. While the motors are described as reversible motors, stepping motors could be used where it is not necessary or desirable to have velocity feed-back sensors such as tachometers. The stepping motors can be operated from pre-programmed controllers that have, in effect, electronic cams therein that can control the motor speed and time of operation. It might be advisable that limit sensors be provided, however, to give an indication of the arrival of the mechanical mechanism into the extremes of movement thereof in performing the various functions.

11 Claims, 14 Drawing Figures

ELECTRONIC CONTROL OF A GLASS FORMING MACHINE

This is a continuation of application Ser. No. 249,280 filed Mar. 30, 1981, now abandoned.

BACKGROUND OF THE INVENTION

The manufacture of hollow glass articles is a very ancient and well known art. However, the necessity of modern mass production of certain glass articles such as glass containers has created the requirements and has resulted in the design of modern automated glassware forming machines. As in most manufacturing processes, the cost of labor has increased to such an extent that automation to conserve labor has become a desirable and necessary fact of operating modern manufacturing facilities. In the glass forming art, the most widely used machine for the production of blown glass containers is the I.S. machine manufactured by the Hartford Division of Emhart Industries. This basic machine also is manufactured by other glass machinery manufacturers in other parts of the world and an example of such a machine may be found in U.S. Pat. No. 1,911,119 issued to Ingle on May 23, 1933.

In general terms, the process of forming hollow glass articles which is carried out by the above-referred-to machine, comprises the sequential feeding of glass gobs to the plurality of forming sections of the machine and sequentially controlling the performance of each forming section of the machine in order to carry out the sequence of operations necessary to produce the finished glass container. This sequence begins with the forming of the gob by the feeder and the distributing of the gobs to the forming section by the operation of a gob distributor mechanism which is positioned beneath the feeder and above the forming machines. The gobs normally are moved by gravity along tracks in troughs to the various sections of the glass forming machine. The gob feeder will produce that number of gobs which will correspond to the number of cavities that are found on the parison mold side of the forming machines. For example, the I.S. forming machine, when a double gob machine, has two gobs formed simultaneously and severed from the feeder to fall by gravity to the parison mold which will have the two cavities therein at the parison forming station. The parisons which are formed within the parison or blank mold, are formed either by operation of a pressing mechanism or by a blow and blow operation where the glass is blown against the baffle and thereafter counterblown into the shape of the blank mold. Once the parison has been formed in the blank or parison mold, the mold will be opened thus leaving the parison in an inverted position, neck down, and carried by the neck molds which surround the neck of the parison. The parison is transferred by a mechanism termed an "invert arm" which turns through 180° to carry the parisons from the blank or parison forming station to a blow mold station. At the blow mold station, the parisons are normally released to the blow molds which are closed about the parisons and the parisons dangle from the upper edge of the blow molds and the neck rings are opened and moved back toward the parison forming side of the machine. At this time, the blowheads will come into overlying relationship with respect to the parisons carried in the blow molds and the parisons will be expanded into the shape of the molds. After the parisons have been blown into final form, the blow molds are normally opened exposing the completed bottles, still positioned on bottom plates of the molds, and the upper ends of the containers are gripped by a set of take-out tongs which will be moved upwardly and then outwardly to transfer the completed containers from the blow molding station and place the blown ware on a cooling dead plate where cooling air will help set up the bottom of the containers.

Each of the foregoing operations have in the past been under the mechanical operation of a plurality of reciprocating air-operated motors. All of the motors are connected by pipes which have their other ends commonly located at what is termed the "kiss plate" or manifold plate of the I.S. forming machine. This manifold plate, generally speaking, is a horizontally extending, elongated plate with a vertical face through which a plurality of passages corresponding in number to the number of operating motors that are found on the glass forming machine. Typically, there are motors which raise and lower the blowheads, previously mentioned, operate the take-out tong mechanism to carry the finished containers from the blow molds to the cooling dead plate, baffle operating mechanism at the parison forming station, and motors for opening and closing the parison molds and blow molds. Each section of an individual I.S. section machine has all of these individual motors therein. The various motors found on the typical I.S. glass forming machine are controlled, as to their operation, by the timing of the introduction of air to the motors to effectuate the operation in one direction or a return direction. The air used to drive the motors, depending upon the size of the motors, could be either very low pressure, such as 10–15 psi, up to pressures as high as 50 pounds per square inch, this being particularly true for those pieces of mechanism which have fairly large mass and are being moved in a fairly short period of time. The control valves for the air normally were fitted in what was termed a "valve block."

The valve block basically was a casting which would have as many as 21 vertically positioned poppet valves in passages therein, with the poppet valves being mechanically operated through valve lifters, the lifters in turn being operated by buttons carried on the circumference of a rotating drum. The position of the buttons on the drum was adjustable, circumferentially thereof, by the manipulation of a hand tool in the setting up and adjusting that could be carried out by the machine operator. Each of the individual section machines had a drum of its own and its own valve block. This drum and all the other drums in the other sections would normally be driven by a common drive shaft which in turn was driven in time with the initial timing motor positioned near and normally electrically coupled to the feeder. The drive motor for the drum shaft would also be electrically coupled to a transmitter found at the feeder.

The sequential operation of the different elements of the glassware forming machine were thereby controlled by the position of a plurality of cam elements arranged in a corresponding plurality of grooves circumferentially extending on the surface of the timer drum. It is obvious that the timing operation was not considered as very accurate, primarily because the adjustment of the cams was done by hand and it is difficult with a hand adjustment to make the very precise, proper adjustment that would be necessary when trying to fine tune the machine. This positioning of the cams on the timing drum is an inexact procedure at best when the drum is stationary and when the operator first sets up the timing or the operation prior to the first startup, but it would become even more time-consuming and a painstaking task to change the settings of the cams with any degree of accuracy while the drum is rotating. As you might expect, the degree of accuracy is likely no greater than 3° in the full circumference of the drum. The glass forming machine being a machine that is handling a gob of hot glass through a series of manipulations to ultimately produce a bottle is so sensitive to thermal imbalances that once the machine is running, it normally is necessary to keep it in hot glass in order to be assured of a thermally balanced operation. Therefore, the adjustment which are normally carried out after the startup, are done as the drum is rotating. In addition to the difficulty with repositioning the cams, as accurately as possible, by loosening and then retightening a nut, the continuous use of the timing drum and the cams causes mechanical wear of the cam surface or of the follower associated with the valve member, that actually operates the valve when actuated by the cam. Such wear sometimes delays the operation of the valve to a significant degree, resulting in irregularities in the forming operation and the resultant production of ware which is unacceptable or which is not properly formed. Finally, the worn cam surfaces may fail to actuate the cam follower operating the valve.

In an effort to avoid the aforementioned problems, electronic timing systems have been devised and provide electronic circuits and counters with memory for determining the number of degrees of rotation associated with each operation of a glass-ware forming machine to accurately proportion the duration of the operation and the sequence thereof so as to avoid the mechanical failures of the cam members of the very well-known mechanical timing drums.

U.S. Pat. No. 3,762,907 issued to Quinn et al., discloses an electronic control system which controls and maintains the sequence of events constituting the various steps of ware formation with a degree of accuracy unobtainable by the mechanical timing drum.

The sequential timing of the operation of each forming section of the machine, in accordance with the above-mentioned patent, is accomplished by means of a timing pulse generator located on the drive shaft of the machine which generates one pulse for every degree of rotation of the shaft. While the reset pulse generator is also mounted on the drive shaft for generating one pulse for every 360° of rotation of the shaft, in order to reset the control for the beginning of a new cycle of the machine, this control contains electronic circuitry and memories to store sufficient information to carry out in sequence the necessary operation of each section of the machine. By this means, timing of the operation of a function may be ordered by the mere manipulation of a switch or by the advance or retarding of a memory input as opposed to the somewhat cumbersome procedure previously found necessary in the prior art of using a timing drum. The sequential timing pulses and reset pulses which are generated by the pulse generator are taken to a sequence-distributing circuit in order to distribute sequential and reset signals to the plurality of individual forming sections contained in the total machine. The electronic control system, in accordance with this patent, also contains emergency stop means as well as a program stop means for each section of the machine in order to enable the operator to stop the operation of various mechanisms of the machine, either in a program stop where the sequence will finish out the movement of a glass gob through the machine before the stop, or an emergency stop where the machine will stop in a mode that would avoid the possibility of operator injury.

This electronic control system disclosed in U.S. Pat. No. 3,762,907 represents a mere replacement of mechanical timer drum and, in essence, acts in much the same manner as the timing drum, inasmuch as the electronic system provides signals to a series of solenoids which control the operation of the plurality of valves, rather than the mechanical operation of those valves which were accomplished previously by the cams on the drum. While the electronic control system is capable of changing or shifting the timing of relative variables, and it may be easily concluded that relative variables, i.e., timing of operations that are computed as a proportion of the duration of the entire cycle, may be accurately shifted, with the selection of the position of a predetermined number of switches. It may also be concluded that the handling and changing or shifting of absolute values can hardly be accomplished because the system is not equipped to effect such changes and even if it were, there is no way of testing the new times selected by the operator and there is no way of knowing in advance if the time selectors are correct to prevent a cutting down of certain variables that cannot be decreased or lengthened in order to coordinate them for the total duration of the cycle. In other words, if the absolute times selected by the operator are not accurate and proper, then this must be learned the hard way because the mistakes cannot be apparent until the machine begins normal operation and the formed goods are then determined to be defective.

One of the operations which is critical, after the bottles are formed into their final shape and the take-out mechanism has moved the bottles to a dead plate, is the sweeping of the bottles from the dead plates onto the moving conveyor, which moves past all of the sections of the forming machine and the sequence with which the bottles are formed and the timing of the movement of the bottles from their dead plates onto the conveyor is a very critical and important operation. There are delays that are built in automatically and in present day forming machines these sweepout mechanisms which sweep the ware through approximately a 90° arc, when moving the ware from the dead plate onto the conveyor, have to be operated at a very controlled rate so as not to tip the bottles as they are engaged by the sweepout fingers to transfer and move the bottles from the dead plates to the moving conveyor. At present, this operation is carried out primarily through the rotation of a cam at each section, driven by a drive mechanism which is driven in synchronism with the moving conveyor.

In the present invention, however, this sweepout mechanism and the other major moving mechanisms of the forming machine are to be directly coupled to a reversible, electric motor operating under the control of a computer where there is a master computer for the entire machine and individual microprocessors within a section operators control box which are programmed and may be operator-changed so as to be tuned in connection with each of the sections generally, independently of the other sections. There is dependence, however, on each of the micro-processors with the section operators control box being under the control of the main computer and the memory contained therein.

FIELD OF THE INVENTION

The present invention relates to electronic control system for glassware and/or other thermoplastic article-forming machines. More particularly, the invention is in reference to electronic timing control systems for glassware machines which provide a real time control of the operation of the ware-forming cycle of the machines.

The present invention provides direct drive, reversible, electric motors for all of the mechanical operations presently carried out on glassware forming machines by reciprocating types of air-operated motors.

SUMMARY OF THE INVENTION

This invention relates to the operation of a glass forming machine in which the charges of glass are delivered into parison molds that are positioned at individual sections of a multiple section I.S. machine. The parisons are formed with their necks down either by press and blow or by the blow and blow process in which a baffle is seated over the open end of the parison mold and the charge is compacted into the shape of the parison mold against the baffle by either the introduction of air under pressure through the neck opening of the parison in the blow and blow process or by the insertion of a long plunger through the neck rings into the parison mold. The baffle is seated by the operation of an electric, reversible motor. After the parison is completely formed, the parison mold is opened, again by the operation of a reversible, electric motor and the formed parison is inverted from the parison mold to a blow mold by the operation of a further reversible, electric motor directly coupled to the mechanism for driving the invert arm. The blow molds also are of the split variety and are opened and closed by a reversible, electric motor. After the bottle is formed by the blowing of air through a blowhead in through the neck of the bottle so as to shape the bottle into its final form, the blowheads are moved out of alignment with the necks of the bottles by the operation of another reversible, electric motor driving the mechanism which operates the blowhead and raises them into position and lowers them over the necks of the bottles to perform the blowing operation. Once the bottles are completely formed, the blowhead is retracted, a set of take-out tongs are operated to come into position over the necks of the bottles and grasps them by their necks and moves the bottles from the blow molds to a cooling dead plate mechanism. The tongs are operated as a mechanical unit, through the operation of a reversible, electric motor directly coupled to the take-out arm-supporting shaft. With the bottles sitting on the cooling dead plate, a sweepout mechanism, which also is directly coupled to a reversible, electric motor, moves the bottles from the dead plate onto the moving conveyor. Thus it can be seen that all of the major moving mechanisms on the glass forming machine are each operated by a reversible, electric motor. All of these motors then are under the control of the micro-processor which is pre-programmed to effectuate the timing of the various motions and control the motors in their repetitive operating motions of the mechanisms. All of the motor driven mechanisms on the glass forming machine are such as to be operated by the operation of its associated electric motor through less than 360° rotation of the motor. In most instances, 180° or less is all that is necessary to effect the total movement of the mechanism through its complete cycle of operation.

DETAILED DESCRIPTION OF THE DRAWINGS

Figure 1:
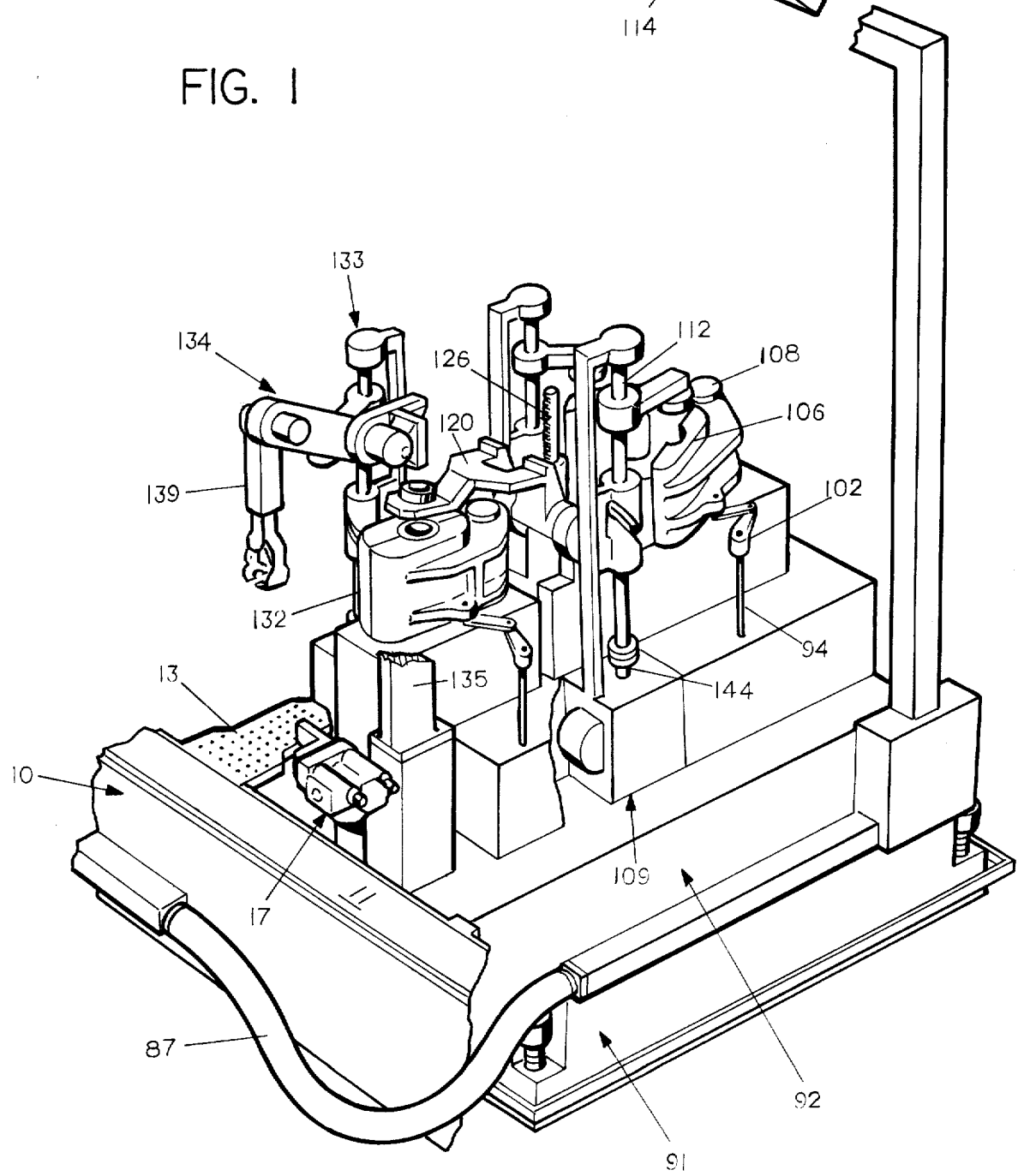
FIG. 1 is a schematic, perspective view of the glass forming machine of the invention.

In FIG. 1, the view is that of what might be termed "one section of a multiple section glassware forming machine with many of the mechanical details removed for the purpose of clarity of illustration but providing a view of the setting for the motor-driven mechanisms."

Figure 11:
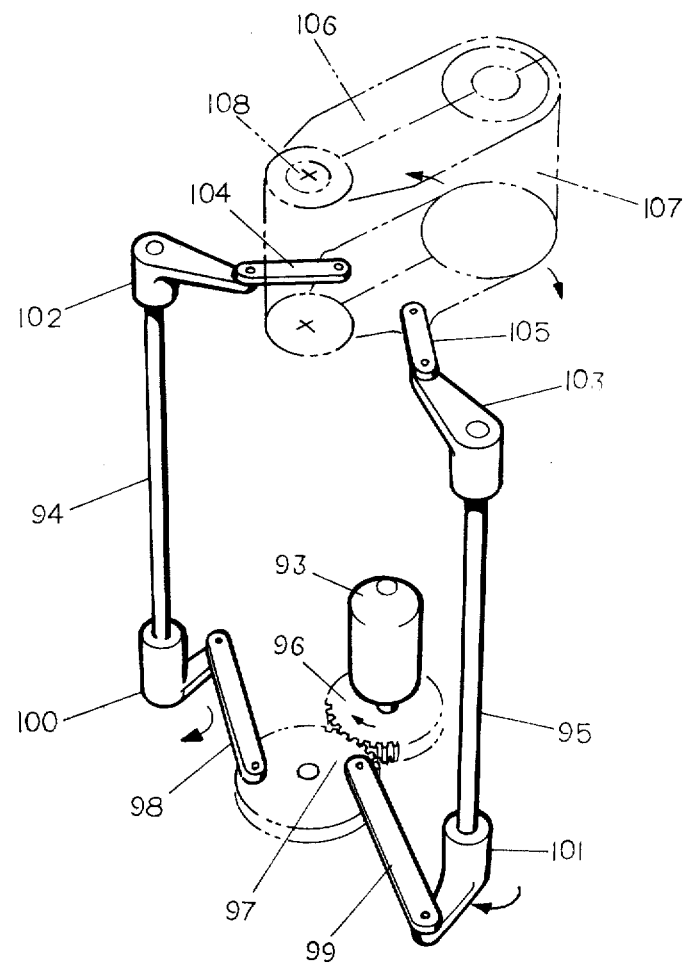
FIG. 11 is a schematic, perspective view of the drive system of the parison mold of the present invention.
Figure 12:
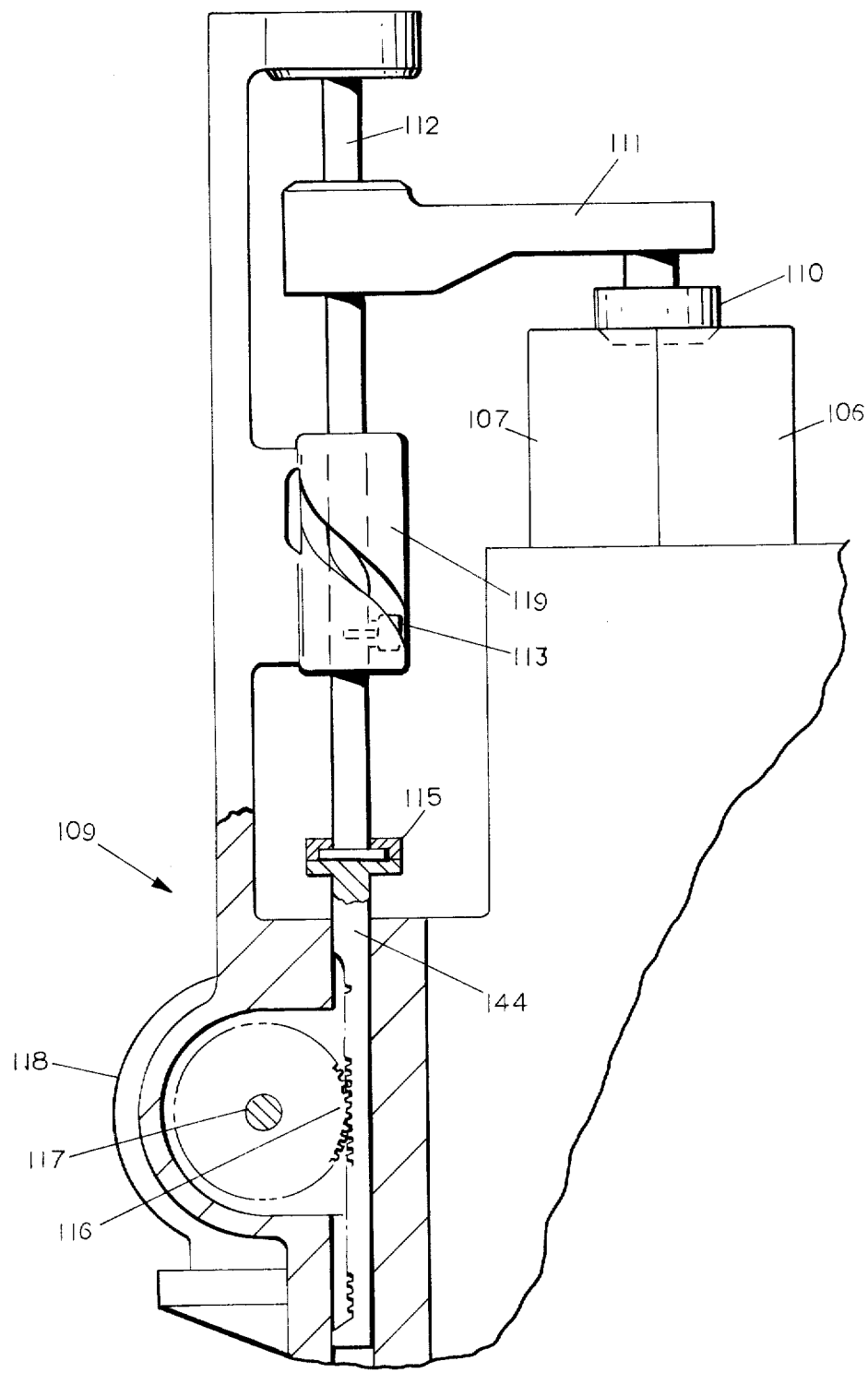
FIG. 12 is a side-elevational view of the drive system for the baffle mechanism found at the parison forming station of the present invention.

The overall schematic apparatus depicted in FIG. 1 shows an end section of a multiple section glassware forming machine with a conveyor 10 having a surface 11 passing along the side of the machine. The section bed has been designated by reference number 91. The section bed 91 actually serves as a bed for the entire number of individual sections which make up the full machine. An individual section frame 92 is positioned on the bed. Generally speaking, the section frame is a rectangular box within which many of the mechanisms for operating the various mechanical members of the machine may be found. As an example, a parison mold-actuating motor 93 which is a reversible, electric motor, is geared so as to drive a pair of vertically extending rods 94. A schematic view in FIG. 11 may be referred to to show how the reversible, electric motor 93 drives the vertically extending rod 94 and its companion rod 95 through the intermediary of a gear 96 and 97. The gear 97 carries a pair of links 98 and 99 which are connected to a pair of cranks 100 and 101 which in turn are connected to rods 94 and 95. The upper ends of the rods 94 and 95 have a pair of cranks 102 and 103 to which links 104 and 105 are connected. The links 104 and 105 are connected to mold halves 106 and 107. The mold halves 106 and 107 are pivoted about a vertical axis 108. Thus it can be seen that the parison mold which is composed of the two halves 106 and 107 is operated by the electric motor 93. The parison mold, when in its closed position, will be provided with one or more mold charges, depending upon whether it is a single, double or perhaps triple cavity mold. Once the charges have been delivered to the mold, a baffle mechanism 109 will be operated to place the baffle over the open upper end of the parison mold. This baffle mechanism is schematically shown in FIG. 12.

When the baffle mechanism is placed in the position, it necessarily will have to come from an extended position up above and swung out of the way so that the parison molds can be loaded. The baffle shown here in FIG. 12, has baffle member 110 carried adjacent the outer end of a baffle arm 111 which in turn is clamped to a vertically extending rod 112. The rod 112 carries a cam follower roller 113 intermediate its length, the lower end of the rod 112 is coupled to a rack 144 by a slip coupling arrangement 115. The rack 114 in turn is in engagement with a pinion 116 carried on a shaft 117 of a reversible, electric motor 118. The cam follower 113 rides within a spiral cam track provided in a cam member 119. The mechanism illustrated in FIG. 12, of course, is schematic; however, it can be seen that the operation of the motor 118 will cause the rack 144 to be reciprocated vertically and during the vertical reciprocation, the driven arm 111 will move vertically upward and swing in a clockwise direction due to the travel of the follower 113 within the cam member 119.

Once the parison is completely formed in the parison mold, the mold halves are opened leaving the parison held from beneath by its neck in a neck mold which is carried by an invert arm 120. The position of the invert arm depicted in FIG. 1 is actually the position of the invert arm after it has delivered its parison to the blow or final mold and is about to be reverted from its position back to the parison or blank mold.

Figure 10:
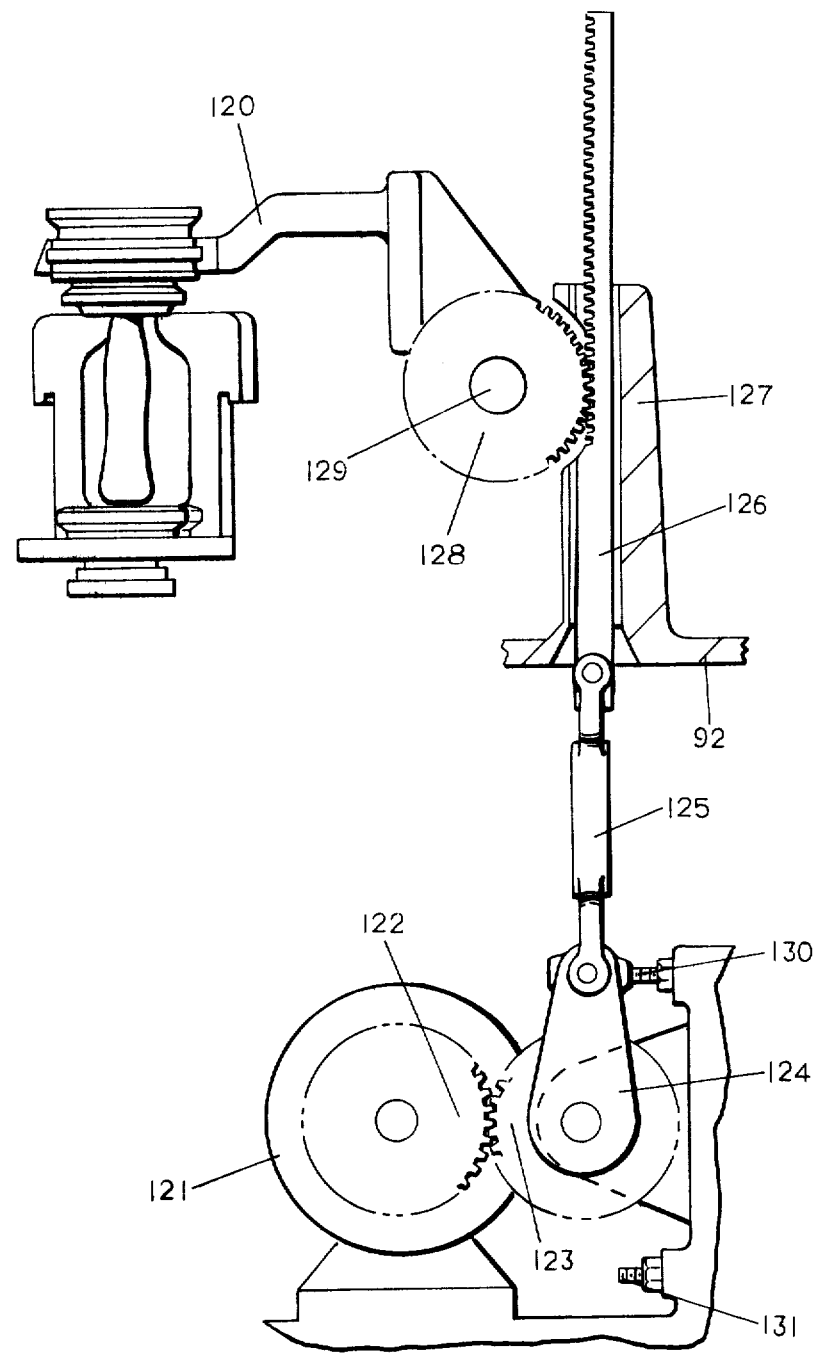
FIG. 10 is a schematic, side-elevational view of the drive mechanism for the invert arm of the present invention.

FIG. 10 may be referred to as showing the electric motor drive mechanism for operating the invert arm 120. This mechanism is comprised of an electric motor 121 driving a spur gear 122 meshing with a second gear 123. The gear 123 drives a crank 124 whose extending end is coupled to one end of a connector rod 125, with the other end of the rod 125 being coupled to a rack 126. The rack 126 is guided within a housing 127 which is mounted on the upper surface of the section frame 92. The rack 126 is in mesh with a pinion 128 which rotates a shaft 129 and the invert arm 120 is coupled to the shaft 129 for movement through 180° of rotation. The crank 124 is limited in its two extremes of movement by a pair of adjustable stops 130 and 131.

Figure 10A:
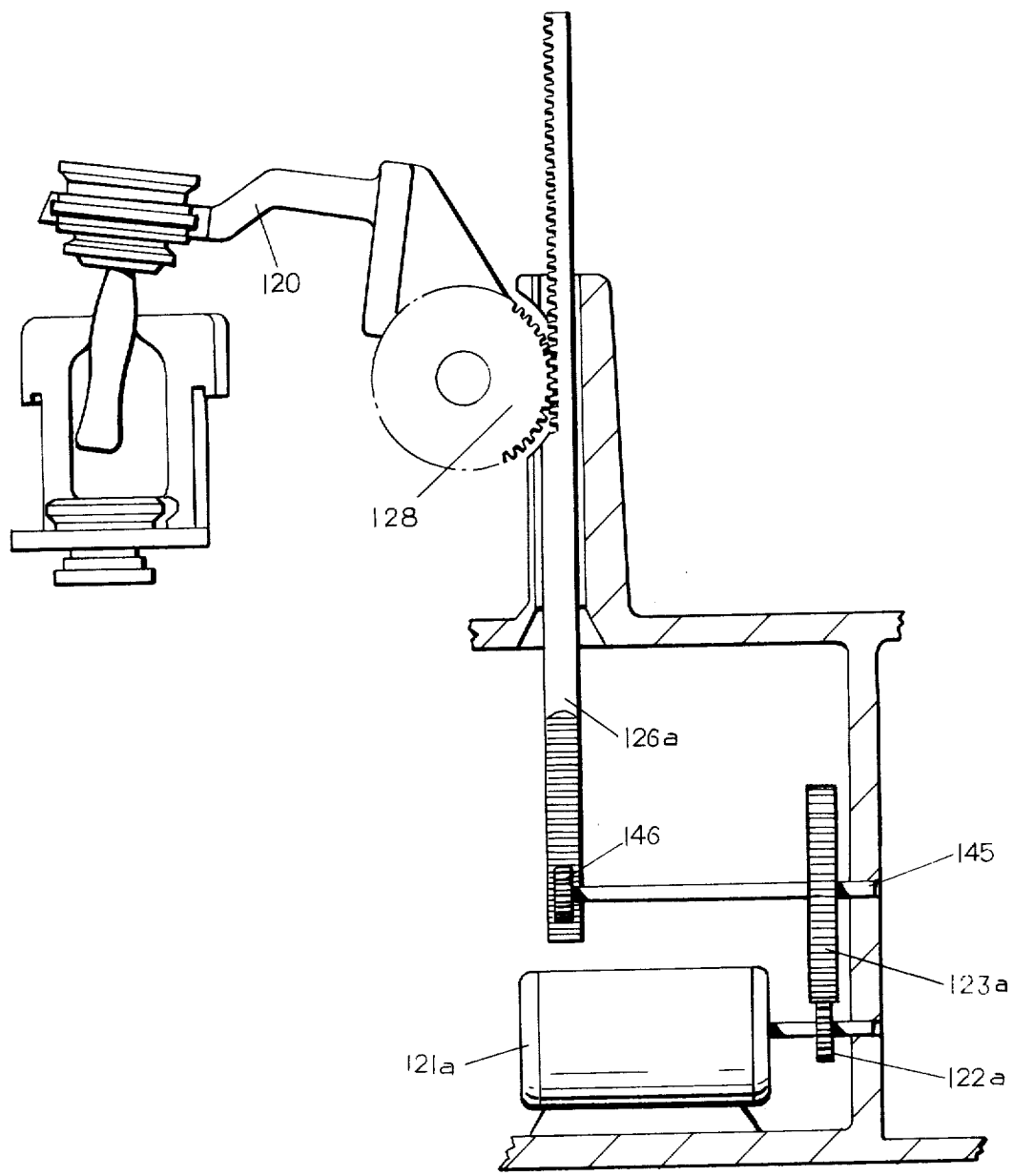
FIG. 10a is a schematic, side-elevational view of a second embodiment of a drive mechanism for the invert arm of the present invention.

The foregoing description of FIG. 10 is of one embodiment of the invert drive mechanism and reference may be had to FIG. 10a where a second embodiment of an invert drive mechanism is illustrated. In this embodiment, the reference numerals that were applied in FIG. 10 are carried with the subscript "a" when referring to substantially the same mechanism. For example, the drive motor 121a drives a pinion 122a which in turn meshes with a second pinion 123a. Pinion 123a is mounted on a spindle 145. The spindle 145 carries a pinion 146 which is in driving engagement with a rack 126a. The drive apparatus of FIG. 10a is actually the preferred drive mechanism and the ratio of the diameters of the gears 122a and 123a would be 4 to 1 with pinions 122a and 146 being the same size. Additionally, the ratio of the pinions 146 to 128 would be 2 to 1. It should be understood that the invert mechanism of the I.S. type forming machine requires greater torque since this mechanism has considerable mass. This is particularly true when the machine may be a triple mold machine where three parisons are simultaneously being transferred. In FIG. 10a the parison transfer has not been completed and the blow mold half is shown slightly ajar.

With regard to FIG. 1, as previously explained, the parison that is formed at the parison mold is inverted and transferred to the blow mold 132. Once the parison has been transferred to the blow mold and the blow mold closed about it, the neck ring will open and the invert arm is reverted back to the parison side and a blowhead mechanism generally designated 133 will be operated to move the blowhead into overlying relationship with respect to the blow mold. The blowhead operating mechanism is of substantially the same character and the motions are essentially the same as that provided by the baffle operating mechanism in FIG. 12 and an electric motor again will be used to actuate the blowhead mechanism and move it into alignment over the blow mold.

Figure 9:
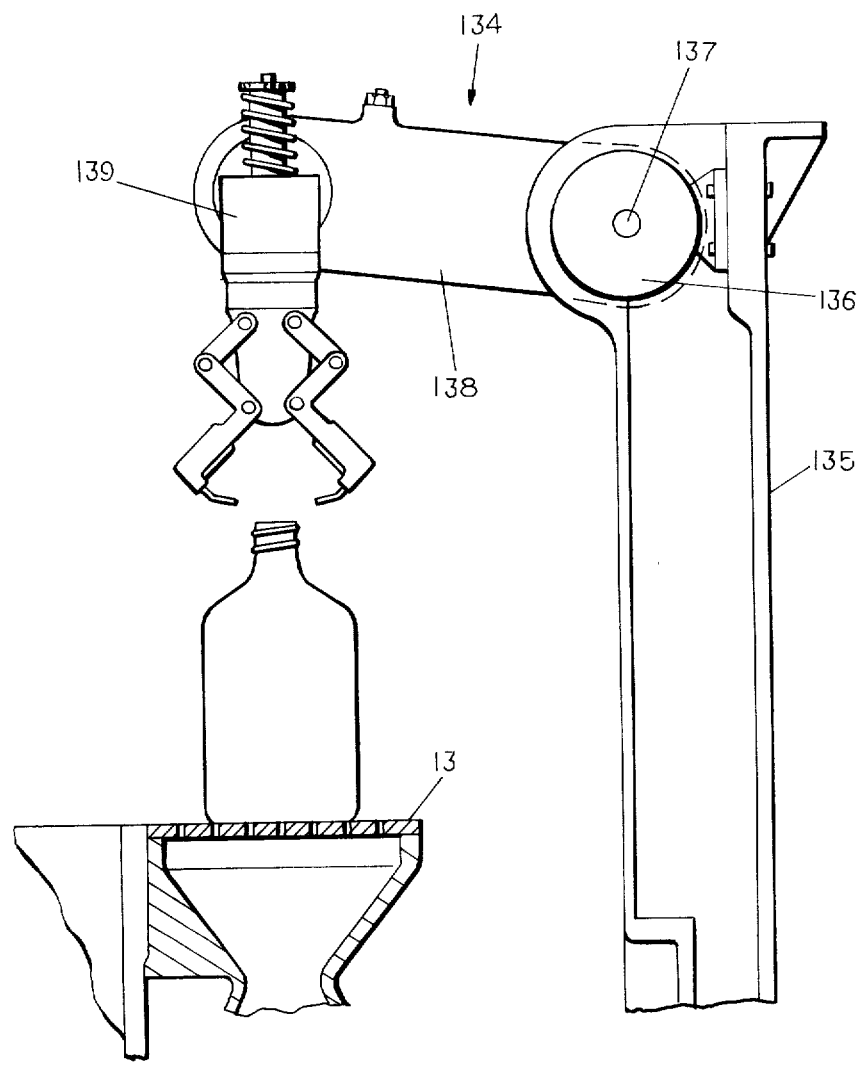
FIG. 9 is a schematic, side-elevational view of a take-out mechanism of the present invention.

After the parison is expanded into a completed bottle in the blow mold, the blow mold will be opened and a take-out mechanism generally designated 134, will be brought into operation to grasp the bottle which has been formed at the blow mold station and transfer the bottle from the blow mold station to the cooling dead plate 13. The take-out mechanism is schematically illustrated in FIG. 9. This mechanism is comprised of a vertical support 135 to the upper end of which is mounted a reversible, electric motor 136 having an output shaft 137. The shaft 137 is coupled to a take-out arm 138 and the extending end of the take-out arm 138 supports a tong mechanism 139. The arm 138 is shown in simple outline. It should be understood that in actual practice, a sprocket would be coupled to the shaft 137 and a second sprocket of equal size would be rotatably mounted at the opposite end of the arm 138. Then, with a chain extending around both sprockets, oscillation of the shaft 137 would result in movement of the arm through 180° while at the same time maintaining the upright attitude of the tong mechanism 139, the tongs are opened for depositing the completed ware on the cooling dead plate 13. After the ware is placed on the dead plate 13, it is moved from the dead plate by the operation of the sweepout mechanism 17.

Figure 2:
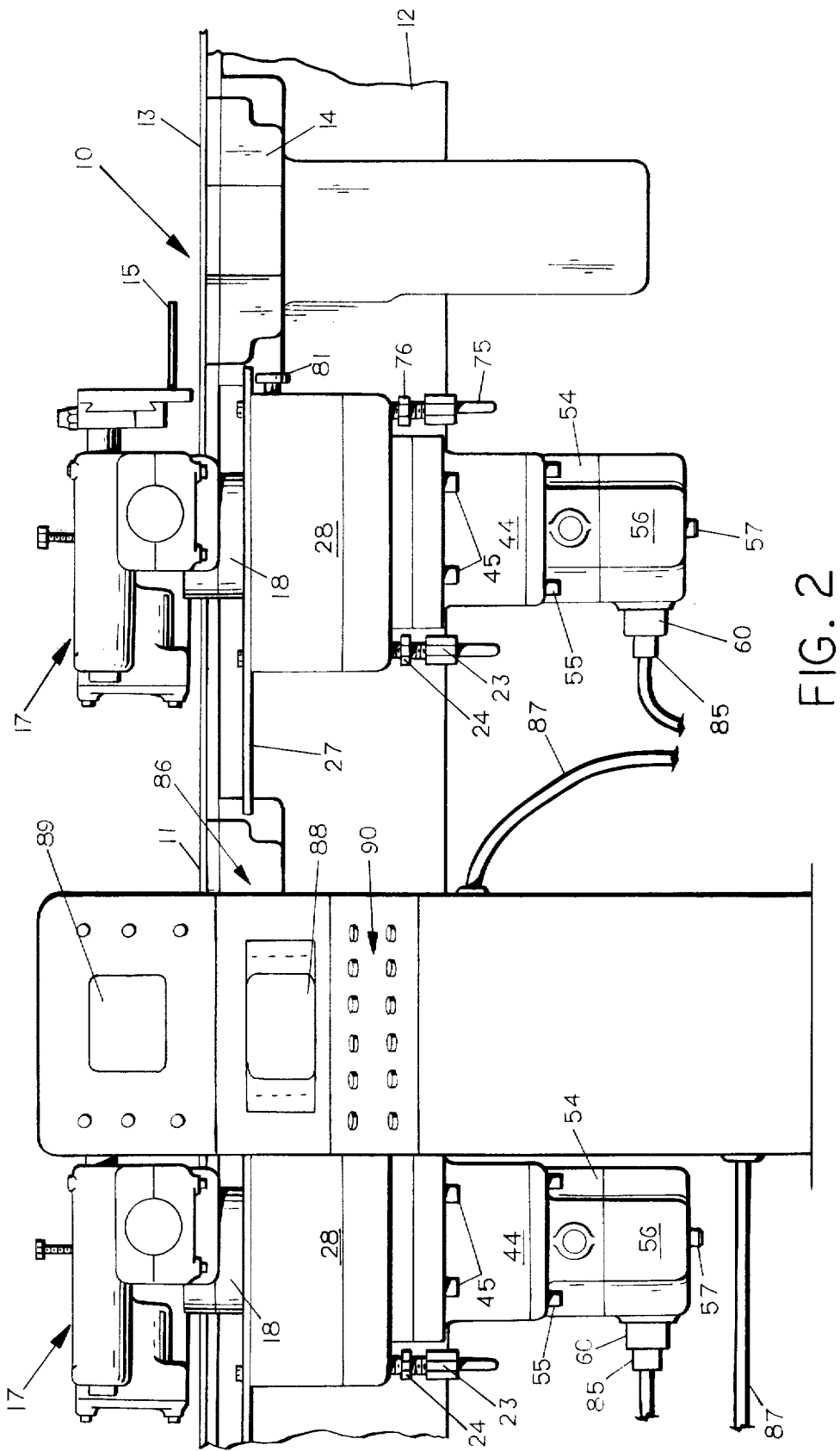
FIG. 2 is a side-elevational view of the sweepout mechanism of the invention.
Figure 3:
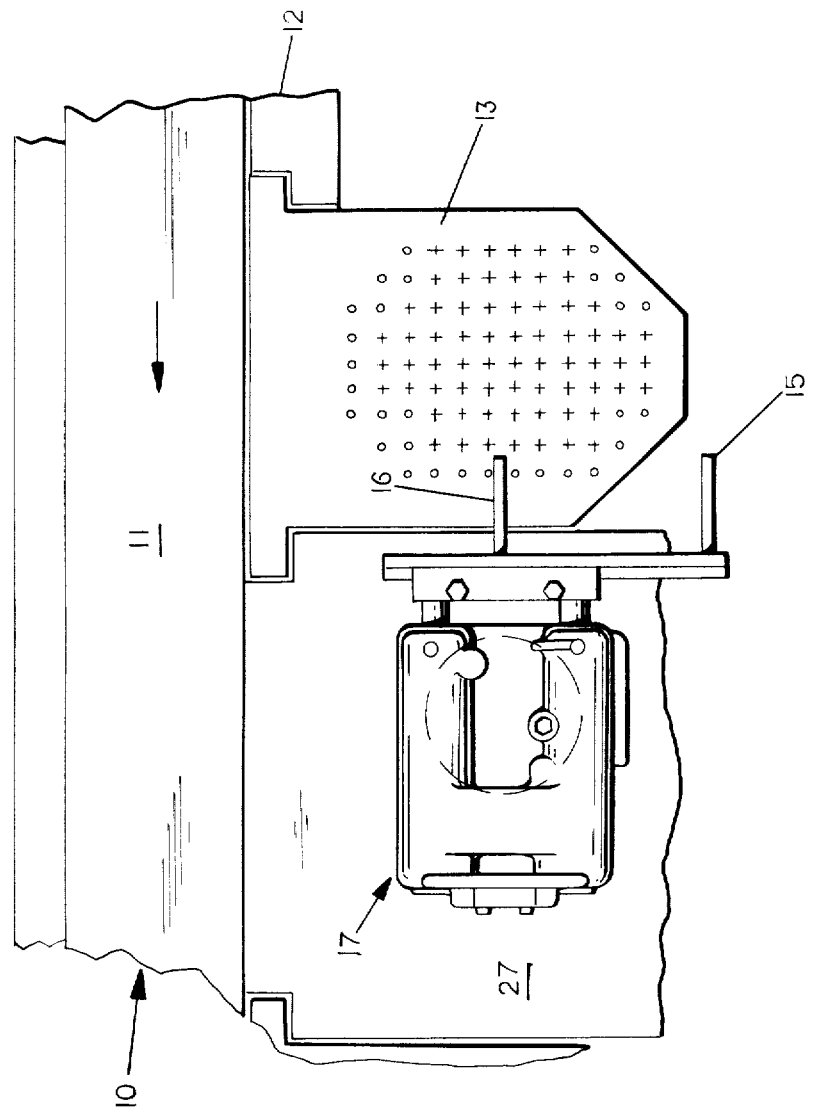
FIG. 3 is a top plan view of one station of the apparatus of FIG. 2.

With particular reference to FIGS. 2 and 3, there is shown a machine conveyor, generally designated 10, having an upper, moving belt surface 11, moving in the direction of the arrow shown thereon and to the left, as viewed in FIG. 1. The machine conveyor is also comprised of an elongated beam 12 which, in actual practice, is hollow along its length being closed at the top by the moving belt 11 and containing cooling air which is circulated therethrough. The cooling air is guided into a hollow chamber 14 over which a perforate plate 13 is mounted. The plate 13 is commonly referred to as the "cooling dead plate" of a glass container forming machine. Newly formed containers are placed upon the upper surface of the plate 13 and their bottoms are cooled by the movement of air thereagainst. These containers, while positioned on the plate 13, are engaged by fingers 15 and 16 of a sweepout head, generally designated 17. The general relationship of the sweepout head 17, the conveyor 10 and the details of the sweepout head itself, which is pneumatically operated, may be found in U.S. Pat. No. 4,199,344 of common assignee to the present case. Such U.S. Pat. No. 4,199,344 is hereby incorporated by reference and disclosure with regard to the sweepout head and the relationship of a sweepout mechanism to a forming machine conveyor will be found therein.

In view of the foregoing "incorporation by reference" of the above patent, detailed description of the sweepout head is not being set forth herein and the relationship of the sweepout head will only be described with regard to the new system for oscillating the head through a 90° angle wherein the fingers 15 and 16 are moved from the position shown in FIGS. 1 and 3 in a counterclockwise direction to slide the container from the dead plate 13 onto the surface 11 of the conveyor 10.

Figure 5:
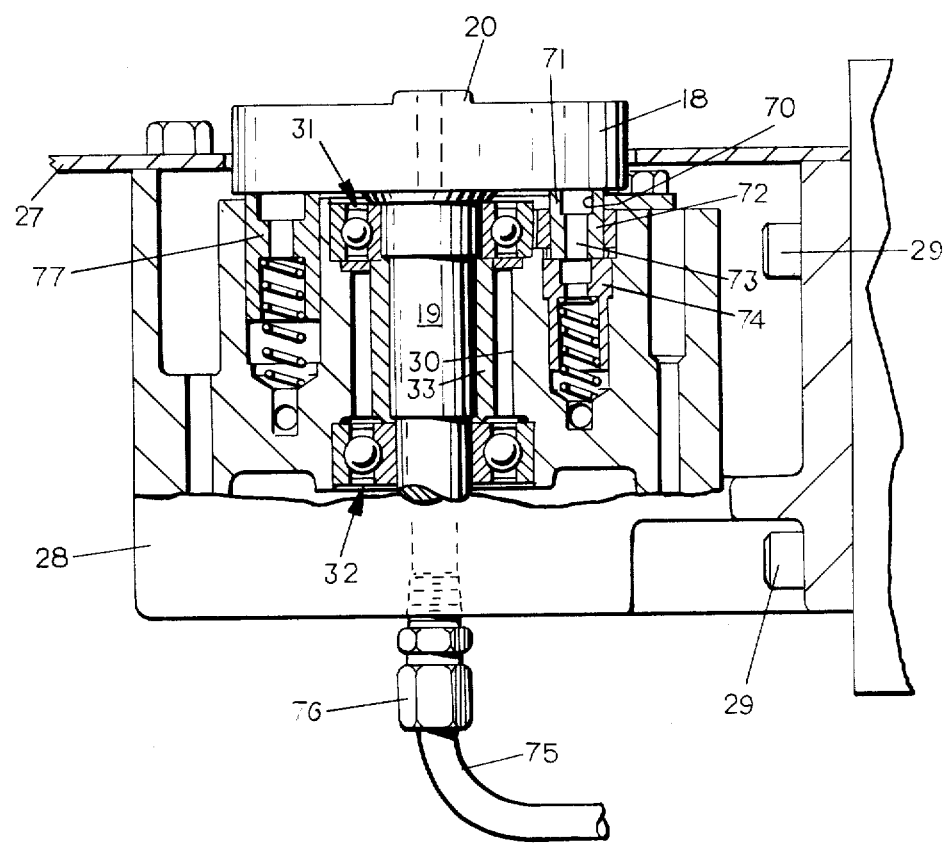
FIG. 5 is a partial cross-sectional view taken at line 5—5 of FIG. 4.
Figure 7:
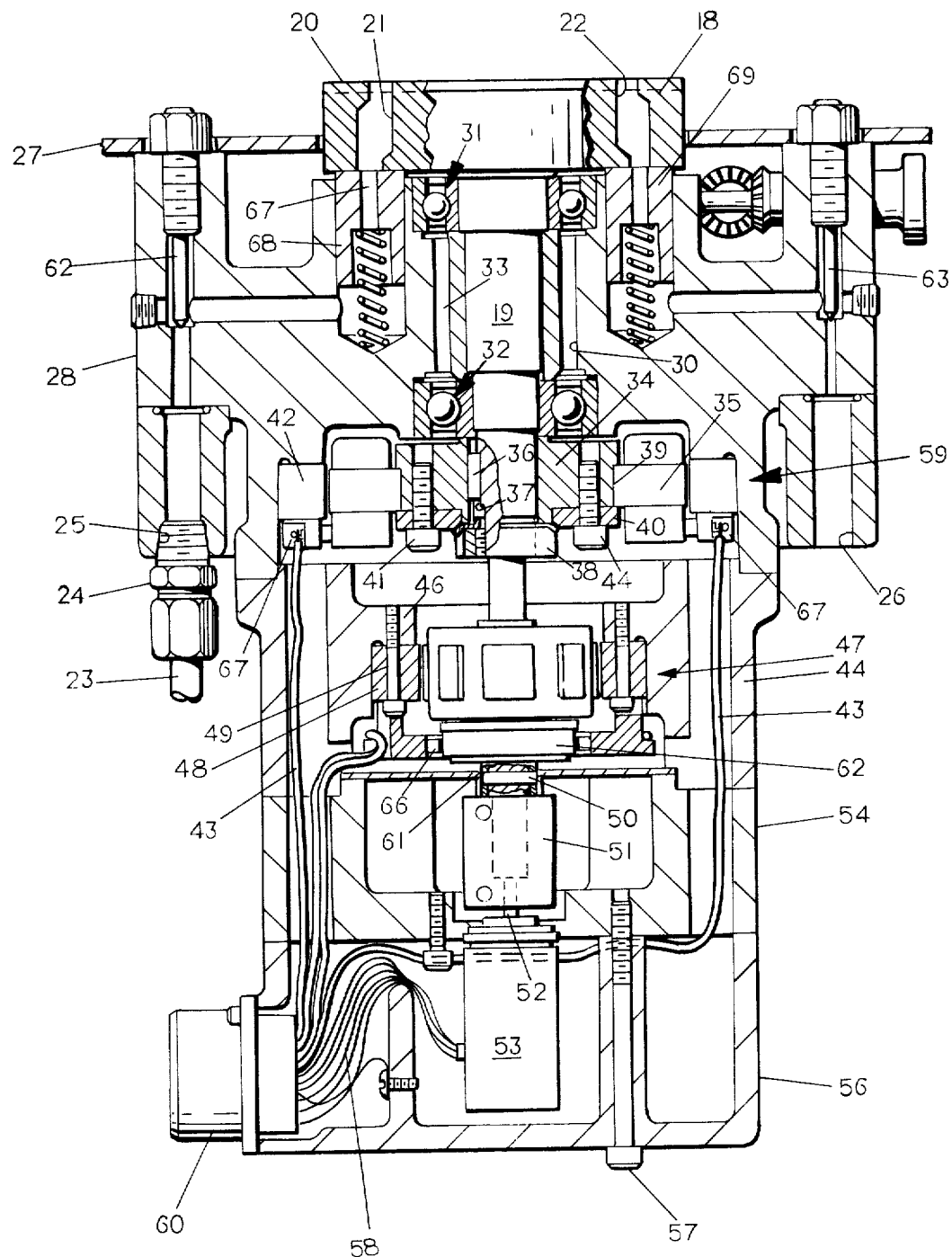
FIG. 7 is a cross-sectional view taken at line 7—7 of FIG. 6.
Figure 8:
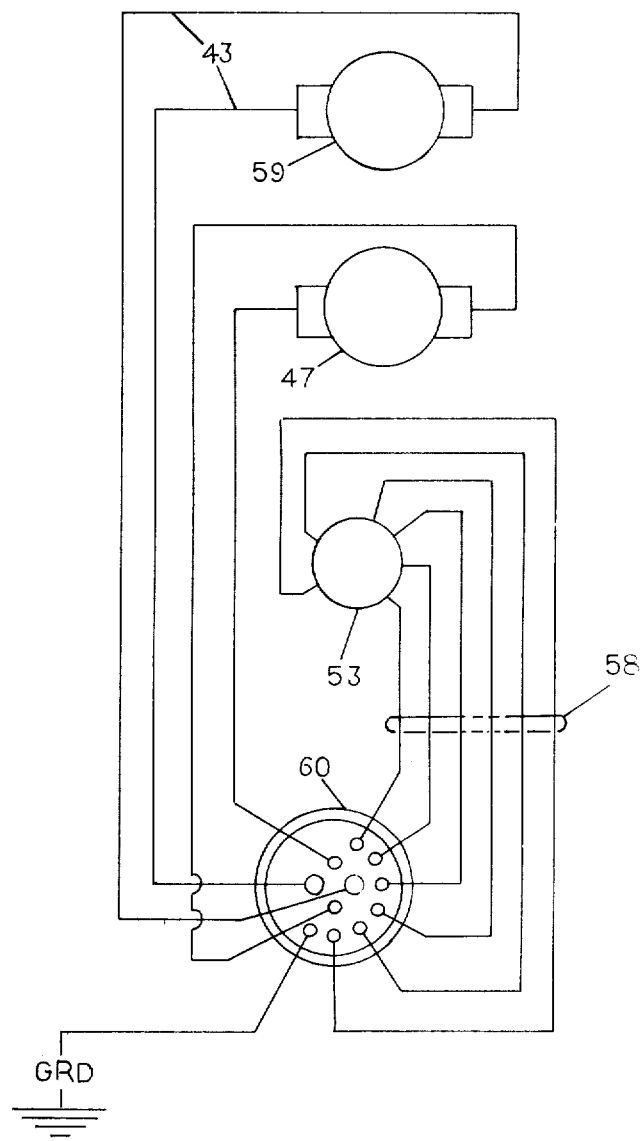
FIG. 8 is a schematic, electrical circuit diagram of the electrical interconnections of the sweepout portion of the invention.

It should be understood that the sweepout head 17 is mounted upon a generally horizontal disk 18 which is fixed to the upper end of a vertical drive shaft 19, as best seen in FIGS. 5 and 7. The disk 18 has a raised boss 20 which serves to accurately locate the positioning of the sweepout head 17 thereon.

Figure 4:
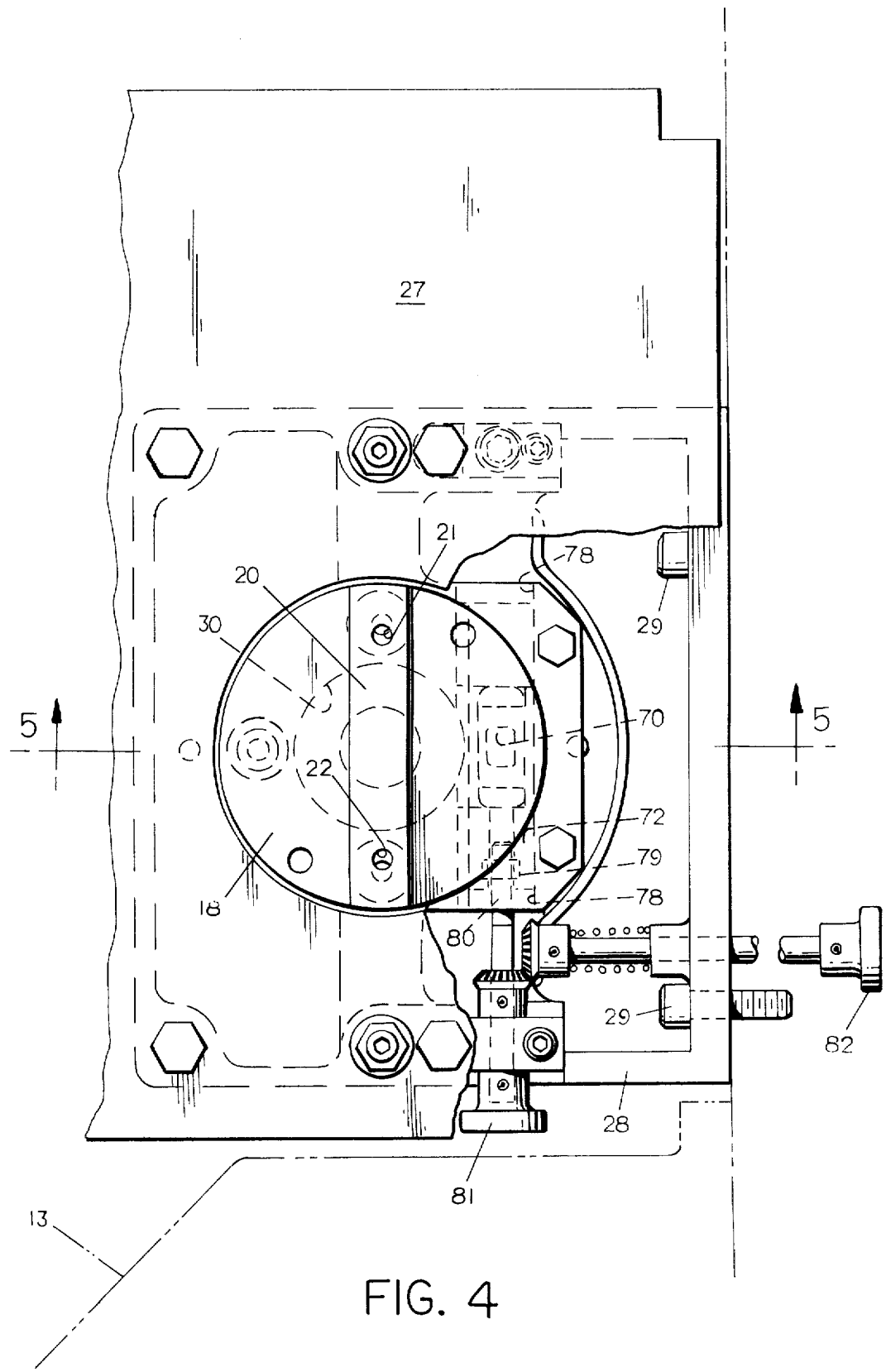
FIG. 4 is a top plan view, similar to FIG. 3, on an enlarged scale and with the sweepout head removed.

As can be seen in FIGS. 4 and 7, the raised boss 20 has a pair of diametrically opposed holes 21 and 22 extending downwardly therethrough. These holes 21 and 22 match up with holes provided in the undersurface of the sweepout head mounting plate and air under pressure is fed through these holes alternatively to effect the outward stroke of the fingers 15. Either the hold 21 or 22 comes into play, depending upon whether the unit is a right-hand sweeping unit or a left-hand sweeping unit. The particular unit which is illustrated herein is a right-hand unit and by the connections shown in FIG. 6, an inlet pipe 23 shown connected by a connector 24 to a port 25, will supply air under pressure out through the hole 21. In the event the apparatus were to be a left-hand unit, the pipe 23 would be connected to a port 26 shown in the diametrically opposite side of the mechanism in FIG. 6 and, when so connected, the air under pressure would exit through hole 22 and thus effect the extension of the fingers 15 and 16 at the proper sequence in the sweepout operation.

Figure 6:
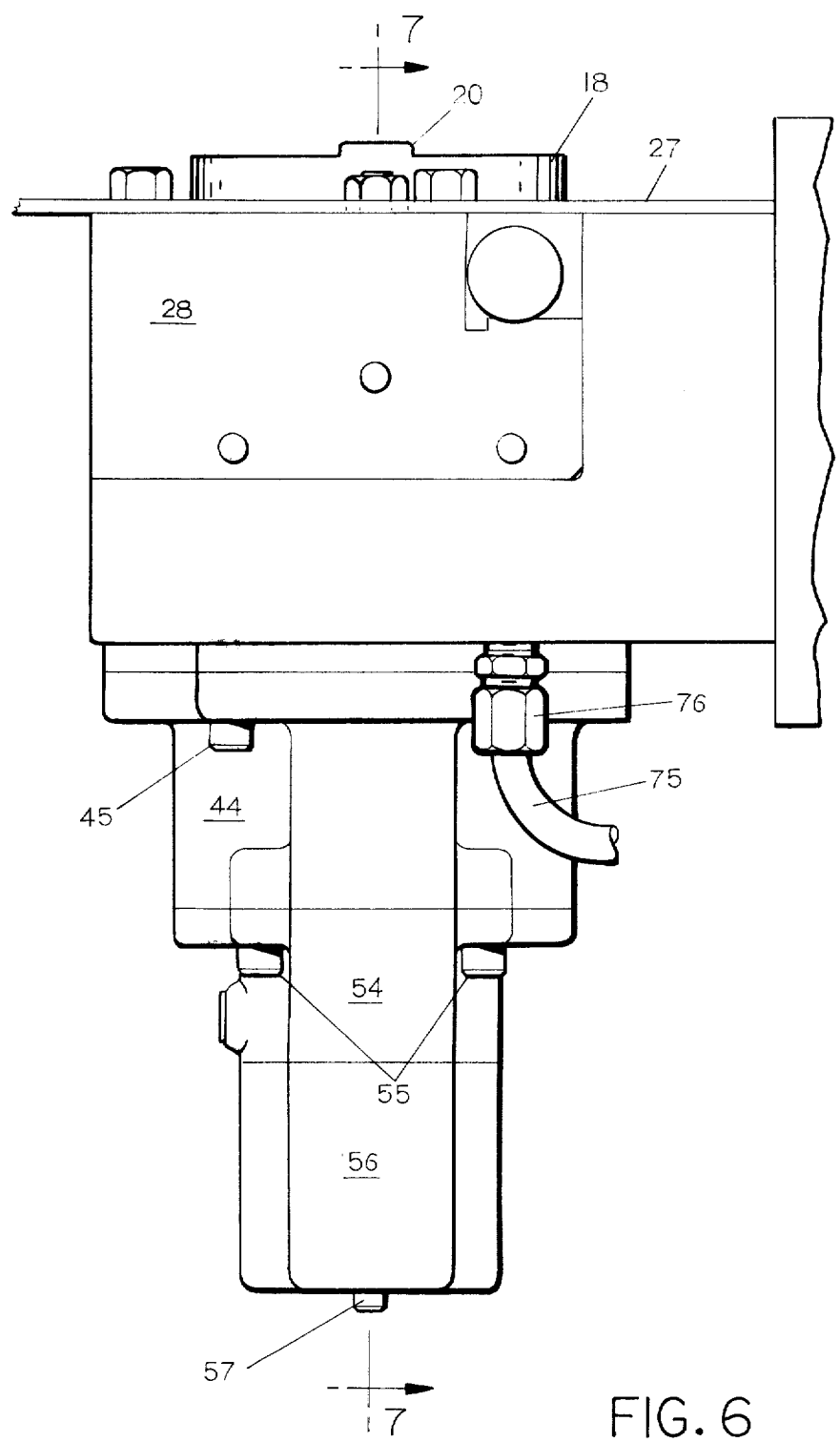
FIG. 6 is a side-elevational view of the apparatus of FIG. 4.

The disk 18 is shown in FIGS. 5-7 as extending upwardly through an opening formed in a cover plate 27. The cover plate 27 is bolted to the upper end of a generally rectangular casting 28. The casting 28 is shown in FIGS. 4 and 5 as attached to the sidewall of the conveyor 10 by bolts 29. The casting 28 has a central opening within which a motor module is held. This motor module has a bore 30 extending vertically downward therethrough. The shaft 19 is supported within the bore 30 by a pair of bearings 31 and 32. The bearings are spaced apart by an annular sleeve 33 and the lower bearing 32 engages a mounting ring 34 for an annular rotor 35. The mounting ring 34 is provided with a keyway within which a key 36 is positioned.

As can be seen in FIG. 7, the shaft 19 is also provided with a keyway 37 within which the key 36 is also positioned. The shaft 19, below the keyway 37, is externally threaded and a retaining nut 38 is threaded thereon and abuts the lower end of the ring 34, thus clamping the bearings and the mounting ring 34 together as a unit, rotatable with the shaft 19. The rotor 35 actually sits within an annular recess 39 formed in the external or circumferential portion of the ring 34 and is retained in this recess by an annular retaining ring 40. The ring 40 is held to the mounting ring 34 by a series of bolts 41. In surrounding relationship to the rotor 35 and spaced therefrom, is positioned an annular stator 42. Electrical leads 43 are shown extending from the area of the stator, through a lower cylindrical housing 44 which is positioned coaxially with respect to the lower end of the casting 28. The housing 44 is held in engagement with the lower end of the casting 28 by a plurality of bolts 45 (See FIGS. 2 and 6).

The housing 44 has an inner wall that forms an annular ledge 46 to the underside of which is mounted a tachometer 47. The tachometer 47 is a purchased unit having an annular stator 48 which is bolted to the ledge 46 by bolts 49. An example of a tachometer that has been found to be suitable for the system set forth herein is one designated TG-2168, made by the Inland Motor Division of Kollmorgen Corp., Radford, Va. This tachometer is supplied in three components, the brush ring assembly, armature assembly and stator assembly. The shaft 19 extends coaxially through the tachometer 47 and has its lower end pinned by a pin 50 to a lower sleeve portion 61 of an armature 62 of the tachometer 47. The armature 62 is also mechanically part of the rotor of the tachometer.

A split sleeve coupling 51 in turn is coupled to the lower end of shaft 19 and to a vertical shaft 52 of a synchroresolver 53. The resolver 53 may, for example, be a Resolver Control Transmitter (brushless) sold by The Singer Company, Kearfott Div., Little Falls, N.J. under specification M-2779. As can best be seen in FIG. 7, the coupling 51 is mounted within an extension 54 beneath the housing 44, with the extension 54 being bolted thereto by bolts 55 (See FIG. 5). A lower, elongated housing 56 is held to the lower end of the extension 54 by bolt 57 and serves as the housing for the resolver 53. It can be seen that the resolver 53 has a plurality of wires 58, actually 6 in number extending therefrom, along with the wires 43 from the stator 42 of the motor 59, and leads from the tachometer 47 extend to a connector 60. The connector 60 is a multiple pin plug for connecting the electrical leads within the drive unit for the sweepout to a computer for controlling the timing of the input to the motor 59 and the feedback input to the computer from the tachometer and resolver.

The motor 59 may be of any known type of reversible D.C. torque motor. An example of one motor which has been used successfully is the frameless motor designated T-4036 or the T-4076 made by Inland Motor Division of Kollmorgen Corp., Radford, Va.

Stator 65 of the tachometer 47 carries a set of brush ring assemblies 66 which ride on the armature 62. The stator 42 of the reversible motor 59 also carries brush assemblies designated 67 which bear against the armature 35. Current is fed to the motor 59 through the leads 43 and will cause the motor to rotate about its axis to the extent necessary to complete a sweepout motion. This degree of motion is normally 90°; however, it is sometimes desirable to have the sweepout rotate through essentially the full 90°, but to retract the fingers at some point either just short of or just beyond the 90° position. This position of bottle release is dictated by the position of the retract air inlet coinciding with the port in the base of the sweepout head.

As previously explained, the fingers 15 and 16 are extended by the alignment of the port 21 with an underlying port 67 in a spring-biased brushing 68 which rides against the undersurface of the disk 18. The bushing 67 is connected by passageways in the casting 28 to the pressure inlet pipe 23. Air from pipe 23 is controlled by the setting of a throttle valve 62 in the casting 28. A similar throttle valve 63 in the casting 28 will control the flow of air through bushing 69 when a left-hand unit is used.

When the sweepout, controllably driven by the motor 59, at a rate monitored by the tachometer and computer, and with its rotational position being monitored by the resolver 53, approaches the end of its 90° sweep, the port 22 will come into alignment with a port 70 (see FIG. 5), in a bushing 71. The bushing 71 is in the form of a movable block 72 which also has a passage 73 therethrough. This passage 73 communicates with a passage in a spring-biased bushing 74. The bushing 74 connects through a passage (not shown) to a conduit 75 that is coupled at 76 to the casting 28. A second bushing 77 that is at 180° with respect to bushing 74 serves as a vent for the other side of the motor on the head 17.

The block 72 is supported for linear, horizontal movement relative to the casting 28 by a rectangular slideway 78 that extends through the casting 28. The block 72 has an internally threaded portion at 79 within which a threaded shaft 80 extends. The shaft 80 is rotatable by either hand wheel 81 or 82, depending upon where the operator may be positioned. It can be seen that rotation of either of the hand wheels will effect rotation of the shaft 80 resulting in movement of the block 72 as the threaded shaft will drive the threaded portion 79. The block 72 is slideable in the slideway 78 and thus the position of the opening or port 70 therethrough can be adjusted relative to the position that the port 22 in the disk 18 will occupy after a particular angular rotation. Thus it can be seen that the alignment position of the ports 22 and 70 may be adjusted and the retraction of the fingers may be controlled to effect the release point in the 90° sweepout motion for the ware being transferred to the conveyor. The ability to adjust this retraction point is important and it should be kept in mind that retraction is done only after the ware is on the conveyor and has moved away from the fingers. The profile of sweepout velocity is selected so that this occurs at the right time and at the proper velocity dictated by the type of ware.

The sweepout finger retraction is related to the deceleration profile of the sweepout head. Since the total time is a constant, we can adjust the retract without further disturbing the profile. Start and stop positions of the head are constant thus we only want to adjust the time to start retract. A numerical display in the controller will give actual time lapse readings and by the use of retard or advance controls the start of the sweepout selected.

As best shown in FIG. 2, then connector 60 has a plug 85 engaged therewith with the plug being connected through a cable to an overhead control box 114 which in turn is connected to a control console 86 by a cable 87. While the console 86 is shown adjacent the machine position, it should be pointed out that its actual physical location will normally be at the end of the machine and will be connected to the plurality of sections that make up the machine. The console 86 may also be provided with a display 88 which will give a readout, on command, of the timing sequence of operation of each of a plurality of sweepout motors and other motors found on the forming machines connected thereto. Furthermore, an additional display 89 that is connected thereto. Furthermore, an additional display 89 that is connected to the section control boxes may give a digital readout of the relative times of operation of each section and its relationship to the other sections.

Some bottles may be tall and less stable than others, thus the necessity for having close control over the motion of the sweepout mechanism. Obviously, changes to the control system may be made in the usual manner by the manual entry in the form of a keyboard 90 or the contrjl of the sweepout motor, as well as the other reversible, electric motors, may be effected by a central computer (not shown) connected to the console 86.

Figure 13:
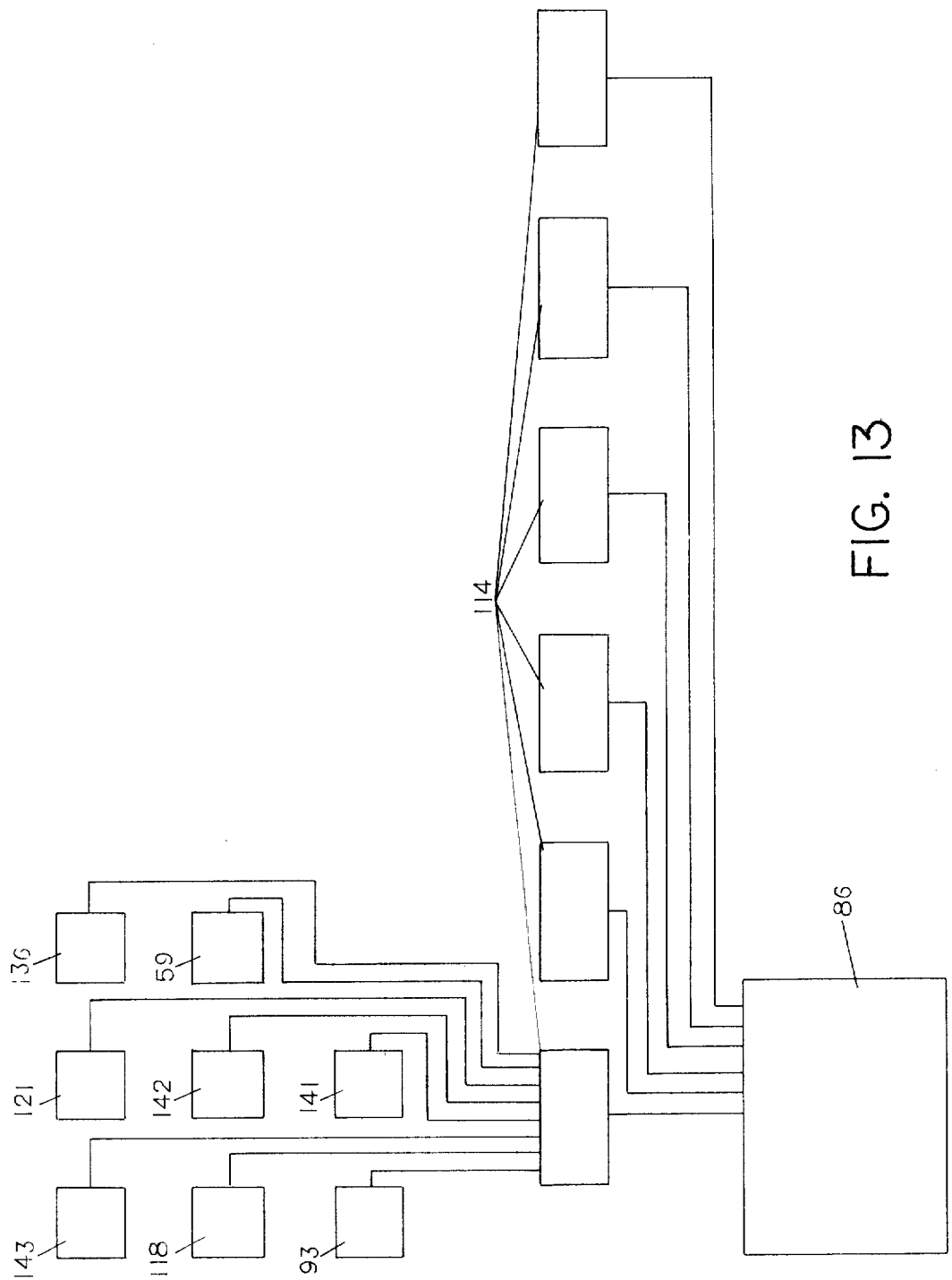
FIG. 13 is a schematic, control circuit diagram of the interconnections of the various motors and their control boxes for each section, as well as the integration of these programmable controllers with the overall controller found for each entire machine.

As shown in the schematic, circuit diagram of FIG. 13, the control console 86 which may be termed a Forming Machine Controller, is connected with each of a plurality of section operator control boxes 114. Each box 114 serves as the immediate controller for the eight reversible motors, including the sweepout motor 59 which in this diagram is represented by box 59, the take-out motor 136, the blowhead operating motor 141, the blow mold opening and closing motor 142, the invert drive motor 121, the parison mold opening and closing motor 93, the baffle operating motor 118 and a funnel operating motor 143. The funnel operating motor 143 is connected to the funnel mechanism 140 (see FIG. 1). The funnel operating mechanism is substantially identical to the baffle operating mechanism, but is located at the opposite side of the section from the baffle mechanism. The funnel serves to guide charges into the parison mold and is removed before the baffle is seated on the mold for pressing a counterblow of the parison. The sequence of the operation of these mechanisms is clearly set forth in the U.S. Pat. No. 1,911,119 mentioned previously.

Each of these motors may be of the "stepping type" A.C. motors which may, in effect, be controlled by a so-called "electronic cam" which is clocked from within the console or from the section operator control box. In the case of the D.C. sweepout motor, where the tachometer and resolver are shown, in detail, it should be apparent that this arrangement would be functional for each of the other motors. However, the important consideration is that all of the motors can be timed and controlled in their operations with a great deal of accuracy and certainly with much closer control than is presently capable of being achieved where the electronic timing of the machines is through the operation of a series of solenoid valves being used to trigger pilot valves for the pneumatic motors that are presently on the machines. These pneumatic motors are potentially capable of inconsistent operations due to the fact that these air motors and air supply systems are sensitive to ambient temperature, humidity and lubrication failure such that they may fail to cycle in a precise period. Further, the air supply lines themselves to the motors are subject to inconsistent operation through leaks or possibly being plugged up with dirt.

While the foregoing description sets forth in some detail the essence of the invention, it should be remembered that with the advent of more and more sophisticated electronic control equipment, the timing operations and the velocity profile of the various mechanical motions on the machine can be predetermined by the pre-programming of the controller, so that as each of the mechanisms are operated, they can be controlled so as to function in a repetitive cycle that is set in the computer. This is true with the output of the tachometer and resolver being compared with present information in the controller so that it can change the motor current to cause the motor to drive the mechanism at the proper, selected velocity profile through its entire cycle.

It should also be apparent that A.C. motors with sufficient torque in small compact sizes are becoming available and with these types of motors, it is only necessary to have a single end position indicator or sensor for a mechanical operating unit so as to know if it has gotten out of synchronism with the system, in order to run them at specific velocities through preset cycles without having any direct feed-back loops.

We claim:

1. Apparatus for transferring glass articles from a plurality of sections of a multiple section glass forming machine comprising:
    a conveyor, common to all of the sections of the forming machine, for carrying formed articles away from the section;
    a sweepout head at each section positioned adjacent the conveyor;
    a vertical shaft connected to each said head;
    a reversible, electric motor having a rotor and stator, said rotor, surrounding and coupled to said shaft;
    a tachometer having its rotor fixed to said shaft and positioned below said motor;
    a resolver coupled to said shaft; and
    a programmable controller electrically interconnecting each said motor, tachometer and resolver for controlling the rotation of each said shaft to move each head through an angle of less than 180° of rotation and return.

2. The apparatus of claim 1 wherein said angle is approximately 90°.

3. The apparatus of claim 1 in which each sweepout head is supported in a casting with its drive motor, and each tachometer supported as a module below the casting and each resolver is also supported in a separable module below the tachometer and motor.

4. An apparatus for forming mold charges of glass into glass containers comprising a pair of pivoted parison mold halves, a pair of rotatable shafts connected by links to said mold halves, a rotatable drive gear connected to said shafts for rotating said shafts in opposite directions through an angle of less than 180°, a first reversible electric motor connected to said drive gear for rotating said drive gear to open and close the molds, a funnel means for guiding mold charges into said parison mold, a vertically reciprocable support shaft for said funnel means, a second reversible electric motor coupled to said shaft for said funnel for reciprocating said funnel support shaft and a programmable control means connected to said first and second reversible electric motors for timing the operation of each motor and for controlling the rate of operation of the motor to perform the opening and closing of the molds and reciprocation of the funnel support shaft in the preselected sequence.

5. An apparatus for forming glass containers wherein an open and closable parison mold is coupled to a pair of oppositely rotatable shafts by drive linkage means, a first reversible electric motor coupled to said drive linkage means to open and close said mold halves, a neck ring transfer mechanism including an arm mounted on a horizontal shaft for pivotal movement through approximately 180° between the parison mold and a blow mold location, a pinion mounted on said shaft, a vertically reciprocable rack in engagement with said pinion, a second reversible electric motor, linkage means coupling the output shaft of said second motor to said rack for vertically reciprocating said rack upon actuation of said motor in two directions, a computer, a programmable controller connected to each machine section, means connecting said computer to said programmable controller and logic means in said controller and connected to said first and second motors for driving said motor at preselected intervals and velocity profiles through the full range of their movement to thereby open the molds and transfer parisons from the parison mold.

6. An apparatus for forming mold charges of glass into glass containers wherein an openable and closable parison mold receives charges through a guide funnel, a baffle is placed over the parison mold, the parison is formed against the baffle, and the parison, after formation, is inverted and transferred to a blow mold, the improvement comprising an open and closable pair of blow mold halves, a pair of oppositely rotatably shafts, means linking each shaft to one of said blow mold halves, a reversible electric motor, linkage means connecting said motor to said pair of rotatable shafts, a pair of takeout tongs for grasping the necks of formed bottles while at the blow mold position, means supporting a horizontally extending arm; said arm being pivoted about a horizontal axis and to the end of which is mounted the takeout tongs, said arm being oscillatable from a position over a dead plate to a position over the blow mold to thereby transfer formed ware from the blow mold to the dead plate, a reversible electric motor coupled to the horitzontal arm of the takeout mechanism for rotating the shaft to effect movement of the arm toward and away from the blow mold, a programmable controller connected to each electric motor, computer means connected to said programmable controller, and logic means in said controller connected to said individual electric motors for controlling the operation of said motor at predetermined intervals and for predetermined times of operation.

7. In a glass forming machine of the individual section type where each section is capable of converting a gob of molten glass into a glass container, the combination of a mechanically moveable guide funnel for guiding the gobs into a split parison mold, a funnel arm connected to said funnel, a first funnel arm supporting shaft extending vertically adjacent the parison mold, a reversible electric motor mechanically connected to said guide funnel, means coupling said electric motor to said funnel supporting shaft for vertically reciprocating said funnel supporting shaft, a baffle arm for supporting a baffle to be placed over the parison mold after the funnel has been removed, a second vertical shaft adjacent to the parison mold on the opposite side from said funnel supporting shaft, said second shaft supporting the baffle arm, a rack member at the lower end of said baffle suporting shaft, a reversible electric motor, a pinion connected to said motor and driven thereby in mesh with said rack for vertically reciprocating said shaft, a computer, a programmable controller means connecting said computer to said programmable controller and logic means in said controller for operating said individual electric motors at preselected intervals and velocity profiles through the full range of their movements whereby the funnel is brought into and seated on the parison mold first to guide the gobs and then is moved away from the parison mold to permit the baffle being seated.

8. In a glass forming machine of the individual section type where each section is capable of converting a gob of molten glass into a completed glass container wherein each section includes a parison mold and a blow mold with means for transferring parisons formed at the parison mold to the blow mold the improvement comprising, in combination, a pair of pivoted blow mold halves, a pair of rotatable shafts connected by links to said mold halves, a rotatable drive gear connected to said shafts for rotating said shafts in opposite directions through an angle of less than 180°, a first reversible electric motor connected to said drive gear for rotating said drive gear to open and close the molds, a blow head, a vertically reciprocable support shaft means for mounting said blow head on a horizontally extending arm, a second reversible electric motor means coupling said horizontally extending shaft for said blow head arm, a reversible electric motor driving the couple to said shaft for said blow head arm to said reciprocating shaft, a programmable controller means connecting said controller to each motor for timing the operation of each motor and for controlling the rate of operation of the motor so as to close the blow molds about a parison delivered thereto and then seat the blow head over the blow mold to effect expansion of the parison within the blow mold, retract the blow head and open the blow mold all in a predetermined sequence.

9. In an apparatus for forming glass containers wherein bottles are blown to their final shape in blow molds located in a plurality of individual section machines, a takeout mechanism at each section for carrying the formed containers from the blow molds to a dead plate, the improvement in combination of a vertical support adjacent said blow mold, an arm extending outwardly from said support, means rotatably supporting said arm in said support for rotation about a horizontal axis, a bottle neck grasping takeout tong carried on the extending end of said arm and being supported thereby, a first reversible electric motor connected to said rotatable arm for moving said arm through an angle of approximately 180° and return for carrying finished containers from the blow mold to a dead plate, a sweepout head mounted adjacent said dead plate, said sweepout head including fingers for engaging a container positioned on said dead plate and sliding said container from said dead plate through an arc of approximately 90° onto a machine conveyor, a second reversible electric motor connected to the sweepout head for oscillating said sweepout head through approximately 90° and return, a computer, a programmable controller connected to said computer and to said reversible motors for controlling the motion of the motors in a preselected sequence and for predetermined angles of rotation and velocity.

10. An apparatus for forming mold charges of glass into glass containers wherein an openable and closable parison mold receives charges through a guide funnel, a baffle is placed over the parison mold, the parison is formed against the baffle, the parison, after formation, is inverted and transferred to a blow mold, and after being blown into a container is transferred from the blow mold to a cooling dead plate, the improvement comprising a neck ring transfer mechanism including an arm mounted on a horizontal shaft for pivotal movement through approximately 180° between the parison mold and a blow mold location, a pinion mounted on said shaft, a vertically reciprocable rack in engagement with said pinion, a first reversible electric motor, linkage means coupling the output shaft of said first motor to said rack for vertically reciprocating said rack upon actuation of said motor in two directions, a pair of takeout tongs for grasping the necks of formed bottles while at the blow mold position, means supporting a horizontally extending arm; said arm being pivoted about a horizontal axis and to the end of which is mounted the takeout tongs, said arm being oscillatable from a position over a dead plate to a position over the blow mold to thereby transfer formed ware from the blow mold to the dead plate, a second reversible electric motor coupled to the horizontal arm of the takeout mechanism for rotating the shaft to effect movement of the arm toward and away from the blow mold, a programmable controller connected to each electric motor, computer means connected to said programmable controller, and logic means in said controller connected to said individual electric motors for controlling the operation of said motors at predetermined intervals and for predetermined times of operation to thereby transfer parisons to the blow mold and take blown containers from the blow mold to a dead plate.

11. An apparatus for forming mold charges of glass into glass containers wherein a parison is formed in a parison mold, the parison, after formation, is inverted and transferred to a blow mold, then being blown into a container is transferred to a cooling dead plate and from the dead plate to a conveyor, the improvement comprising a neck ring transfer mechanism including an arm mounted on a horizontal shaft for pivotal movement through approximately 180° between a parison mold and a blow mold location, a pinion mounted on said shaft, a vertically reciprocable rack in engagement with said pinion, a first reversible electric motor, linkage means coupling the output shaft of said first motor to said rack for vertically reciprocating said rack upon actuation of said motor in two directions, a vertical support adjacent said blow mold, an arm extending outwardly from said support, means rotatably supporting said arm in said support for rotation about a horizontal axis, a bottle neck grasping takeout tong carried on the extending end of said arm and being supported thereby, a second reversible electric motor connected to said rotatable arm for moving said arm through an angle of approximately 180° and return for carrying finished containers from the blow mold to a dead plate, a sweepout head mounted adjacent said dead plate, said sweepout head including fingers for engaging a container positioned on said dead plate and sliding said container from said dead plate through an arc of approximately 90° onto a machine conveyor, a third reversible electric motor connected to the sweepout head for oscillating said sweepout head through approximately 90° and return, a computer, a programmable controller connected to said computer and to said reversible electric motors for controlling the motion of the motors in a preselected sequence and for predetermined angles of rotation and velocity.

* * * * *